United States Patent [19]

Frank

[11] Patent Number: 4,852,581

[45] Date of Patent: Aug. 1, 1989

[54] PRESSURE TRANSDUCER WITH CONDUCTIVE POLYMER BRIDGE

[75] Inventor: Thomas P. Frank, Dublin, Ohio

[73] Assignee: Medex, Inc., Hilliard, Ohio

[21] Appl. No.: 132,014

[22] Filed: Dec. 14, 1987

[51] Int. Cl.$^4$ .............................................. A61B 5/02
[52] U.S. Cl. .................................. 128/672; 128/675; 338/4; 73/726
[58] Field of Search ............................... 128/672–673, 128/675, 748; 338/3–4, 36, 42; 73/725, 726, 727

[56] References Cited

U.S. PATENT DOCUMENTS

| | | | |
|---|---|---|---|
| 3,219,035 | 11/1965 | Pressman et al. | 128/672 |
| 3,341,794 | 9/1967 | Stedman | 338/4 |
| 4,023,562 | 5/1977 | Hynecek et al. | 128/675 X |
| 4,116,075 | 9/1978 | Ort | 338/4 X |
| 4,231,011 | 1/1980 | DelVecchio et al. | 73/726 X |
| 4,333,349 | 6/1982 | Mallon et al. | 338/4 X |
| 4,376,929 | 3/1983 | Myhre | 338/4 |
| 4,488,436 | 12/1984 | Mohri et al. | 338/42 X |
| 4,506,250 | 3/1985 | Kirby | |
| 4,618,844 | 10/1986 | Takahashi et al. | 338/36 X |

OTHER PUBLICATIONS

Thick-Film Pressure Sensors: Performances and Practical Applications by R. Dell'Acqua, G. Dell'Orto and P. Vicini, European Hybrid Micro-Electronics Conference, Avignon, France, May 20, 21 & 22, 1981, pp. 121-134.
"A Flow-Through Transducer for Biomedical Applications" by Thomas P. Frank: Aug. '81 iss. *Proceedings IEEE Transactions on Biomedical Engineering:* Colvern Literature on Automotive Sensors; Conductive Polymer Series CP1600 & CP1700: Conductive Plastic Series 11CP, 15CP 18CP & 20CP; Conductive Polymer Strain Sensors provisional data sheet: Conductive Plastic Pots—a New Approach by H. V. Swindell, reprinted from New Electronics 3-22-83.
"New Sensing Role for Conductive Polymer" Auto Industry Newsletter published by Industrial Newsletters, P.O. Box 96, St. Albans, Herts, AL 12AN, England, approx. 1-2 years ago.
"Effects of Axial Stretching on the Resistivity of Carbon Black Filled Silicone Rubber" by J. Kost, M. Narkis and A. Foux *Polymer Engineering and Science,* Jul., 1983, vol. 23, No. 10, pp. 567-571.
"Investigation of the Performance of Conducting Polymer Strain Gauge" by H. J. MacGillivray, M. R. Etemad & G. A. Webster, Mechanical Engineering Department Imperial College of Science and Technology, Dec., 1985, pp. 46-48 (private study: not published).
"Resistivity of a Composite Conducting Polymer as a Function of Temperature, etc.," by B. Lundberg and B. Sundqvist, J. Appl. Phys. 60(3), Aug. 1, 1986, pp. 1074-1079.
"Long Term Stability of Thick Film Resistors Under Strain" by R. Dell'Acqua, G. Dell'Orto, A. Simonetta, *The International Journal for Hybrid Microelectronics,* vol. 5, No. 2, Nov. 1982, pp. 82-85.
"Flat Diaphragm with Rigid Center", pp. 157-163, Flat and Corrugated Diaphragm Design Handbook, Mario DiGiovanni Marcel Dekker, Inc., N.Y. 1982.

*Primary Examiner*—Kyle L. Howell
*Assistant Examiner*—Angela D. Sykes
*Attorney, Agent, or Firm*—Wood, Herron & Evans

[57] ABSTRACT

A pressure transducer has a thin central portion formed of a molded thermoplastic resin. A conductive polymer forms the resistive elements of a Wheatstone bridge printed and baked onto the molded substrate.

6 Claims, 1 Drawing Sheet

4,852,581

PRESSURE TRANSDUCER WITH CONDUCTIVE POLYMER BRIDGE

BACKGROUND OF THE INVENTION

This invention relates to a pressure sensor of the type that is used in a blood pressure transducer.

The blood pressure transducer of the type disclosed in copending application Ser. No. 009,643, filed Jan. 27, 1987, pending, employs a silicon sensor. The silicon sensor is very small, being a fraction of a square inch in area. It is circular in cross section and has a Wheatstone bridge strain gauge formed of piezo-resistive elements diffused into the silicon substrate. The silicon substrate is chemically etched away on the surface opposite the Wheatstone bridge so as to form a thin silicon diaphragm that flexes when subjected to pressure causing the resistors in the Wheatstone bridge strain gauge to be stressed to produce an indication of the applied pressure. The manufacturing process for the silicon sensor is necessarily expensive. Further, the sensor is temperature-sensitive and therefore requires a temperature compensation circuit.

Strain gauges have been formed in other ways. It is known to form a strain gauge by depositing a thick film resistor on alumina. The resistor must be baked at a high temperature of the order of 800° F. Hence, a ceramic such as alumina is required as the substrate.

It is also known to form strain gauges from conductive polymers, again using alumina as a substrate. These thick film resistor and conductive polymer strain gauges have all been massive compared to the tiny silicon sensor.

BRIEF DESCRIPTION OF THE INVENTION

An objective of the present invention has been to provide a less expensive sensor to replace the silicon sensor.

This objective of the invention is attained by molding a diaphragm from a high temperature thermoplastic. The diaphragm is molded in a cup shape having thick edges and a thin, flexible central portion onto which the strain gauge is to be formed. With the molding of the plastic, the expensive diffusion process and etching steps required with a silicon sensor are eliminated.

A Wheatsone bridge of conductive polymers is screen printed onto the surface of the thin central diaphragm of the molded element. The conductive polymers can be trimmed to a desired resistance value using a Nd-YAG laser or abrasive-type trimmers. The conductive polymers are baked onto the substrate at over 400° F. Metal conductors are printed on the surface of the substrate at the ends of the resistor elements. These metal conductors are connected by a conductive epoxy to lead wires by which the sensor is connected into its monitoring circuit.

Among the advantages of the invention are that it is much less expensive than the silicon sensor, being a small fraction of the cost of the silicon sensor. The sensor of the present invention is substantially temperature-insensitive and hence requires no temperature compensation network as is required with the silicon sensor.

BRIEF DESCRIPTION OF THE DRAWINGS

The several features and advantages of the present invention will become more readily apparent from the following detailed description taken in conjunction with the accompanying drawings in which.

DETAILED DESCRIPTION OF THE INVENTION

Figure 1:
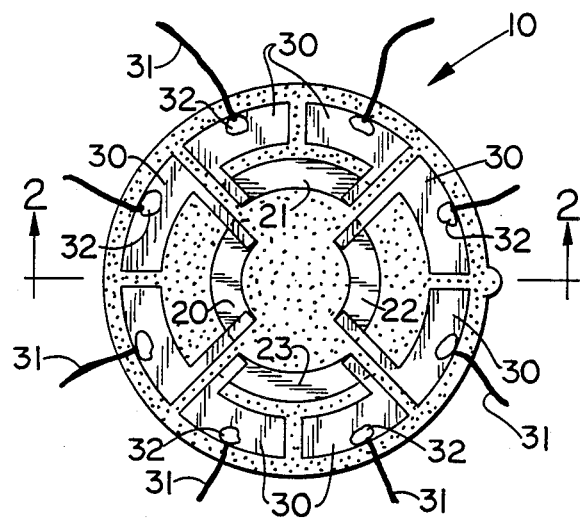
FIG. 1 is a plan view of a sensor of the present invention.
Figure 2:
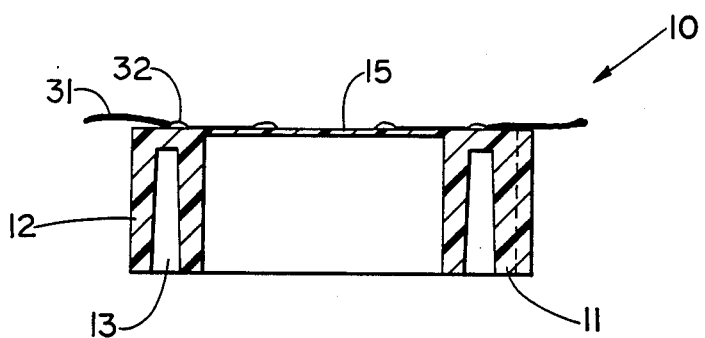
FIG. 2 is a cross-sectional view taken along lines 2—2 of FIG. 1.

Referring to the drawings, the sensor is indicated at 10 and has a substrate 11 formed of a thermoplastic resin. The preferred material for the substrate is Ryton R4 (40% glass, polyphenylene sulfide) manufactured by Phillips Chemical Co. Division of Phillips Petroleum. Other materials are polyethersulfone (VITREX PES by Imperial Chemical Industries), polyetheretherketone (VITREX PEEK) by Imperial Chemical Industries, polyetherimide (ULTEM 1000 by General Electric) and liquid crystal polymer (Vectra A150 by Celanese Advanced Technology Company). The substrate has a thick perimeter 12 having a series of stress-relieving cavities 13 spaced around its circumference. The perimeter is preferably about 0.150" thick.

The central portion consists of a thin diaphragm 15 that has a thickness in the range of 5 to 15 mils. The thickness of the diaphragm is governed by two major considerations. The thicker the diaphragm, the greater is the linearity of the output. The thinner the diaphragm, the greater is its sensitivity. Therefore, a thickness of about 10 mils producing a sensitivity of 15 $\mu$v/v/mmHg is preferred. The diaphragm is preferably about 0.500" in diameter. The diameter of the entire substrate is about 0.800".

Referring particularly to FIG. 1, conductive polymer resistors 20, 21, 22 and 23 are screen-printed on the diaphragm.

Printed conductor material such as paladium silver is applied as at 30 to the ends of each of the resistive elements 21–23. Leads 31 are connected to the printed conductor material by a conductive epoxy 32.

Figure 3:
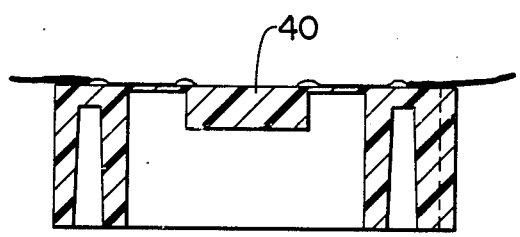
FIG. 3 is a cross-sectional view similar to that of FIG. 2 of an alternative embodiment.

In the alternative embodiment of FIG. 3, the element differs only from the element of the previous embodiment in the thick center portion 40. The center portion is preferably a thickness in the range of 0.080" to 0.090" and is ¼" in diameter. Sensors having rigid centers are known. The rigid centers are used for increasing the effective area and for generating high stresses in the diaphragm at lower deflection levels, thus improving the overall performance of the diaphragm.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof.

I claim:

1. A pressure transducer comprising:
   a molded high temperature, thermoplastic substrate having a thin flexible section,
   at least one conductive polymer resistor printed on said flexible section,
   said resistor changing its resistance when said substrate is flexed.

2. A pressure transducer comprising:

a molded substrate formed from a high temperature thermoplastic material having a thick border and a thin flexible central section, a resistance bridge formed of conductive polymer resistors printed and baked on said thin central section, said resistors having ends, and conductors connected to the ends of said resistors.

3. A transducer as in claim 2 in which said conductors are printed on said substrate and leads are connected to said conductors with a conductive epoxy.

4. A transducer as in claim 2 in which said thick border is circular.

5. A transducer as in claim 2 in which said thick border is circular and the center of said central section has a thick integrally-molded boss forming a rigid center.

6. A transducer as in claim 2 in which said thin central section has a thickness in the range of about 5 to 15 mils.

* * * * *